Nov. 22, 1955 G. E. FOSTER 2,724,820
STEP-FUNCTION OUTPUT MEASURING DEVICE
Filed May 15, 1952 2 Sheets-Sheet 1

Inventor
George E. Foster
By J. Irving Silverman
Attorney

Nov. 22, 1955    G. E. FOSTER    2,724,820
STEP-FUNCTION OUTPUT MEASURING DEVICE
Filed May 15, 1952    2 Sheets-Sheet 2
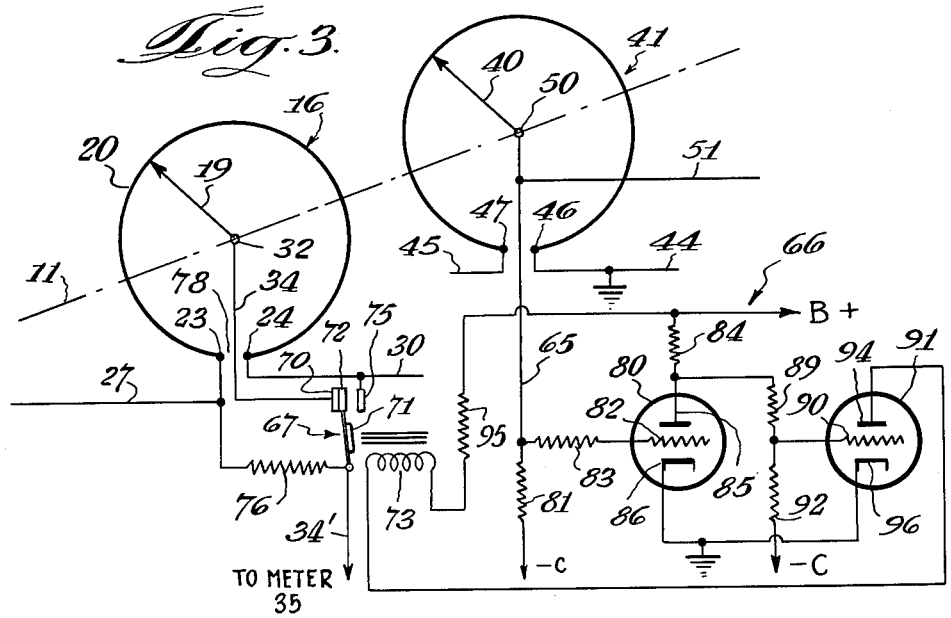
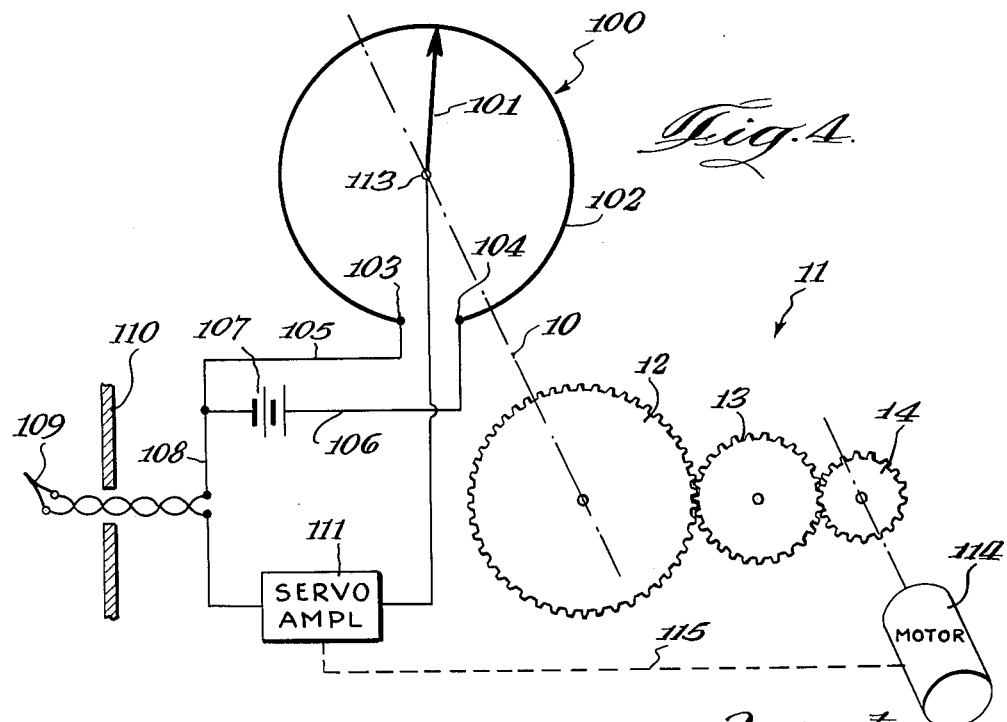
Inventor
George E. Foster
By J. Irving Silverman
Attorney

United States Patent Office 2,724,820
Patented Nov. 22, 1955

2,724,820

STEP-FUNCTION OUTPUT MEASURING DEVICE

George E. Foster, Chicago, Ill.

Application May 15, 1952, Serial No. 288,077

14 Claims. (Cl. 340—184)

This invention relates generally to measuring instruments and more particularly is concerned with a device having a step-function output that is, one in which an output quantity such as voltage increases with the input, but only in incremental steps.

It is often required that an output of a measuring or indicating device be obtained in terms either adaptable to the actuation of recording devices or adaptable to the actuation of indicating meters. Specifically, I have in mind the conversion of the rotation of the shaft into some function proportional to or indicative of the amount of such rotation. This type measurement is not easy to make and is especially difficult to make accurately. The invention herein enables the rotation of a shaft to be indicated by at least two quantities, the first of which represents a coarse reading and the second of which represents a fine reading. In other words, if the output of my new device is to read in volts, the first output quantity is in whole volts and the second quantity is in fractions of a volt. I can use such output operating into two meters, for example, in the first of which the needle moves a volt at a time, and in the second of which the needle moves gradually and conventionally. I would thus have a reading which is highly accurate, since the fractional output can be fed into an accurate meter whose range need only be say one volt.

At the outset, it is to be understood that the invention principally lies in being able to arrive at a step-function output since the fractional output is obtained in a conventional manner.

Accordingly, the principal object of the invention is to provide a measuring device for converting the rotational movement of a shaft into an electrical quantity, whose value increases by equal steps.

Still a further object of the invention is to provide a measuring device in which the rotation of a shaft is converted into a step-function electrical quantity proportional to the rotation of the shaft but only at predeermined angularly spaced positions of the shaft.

Still another object of the invention is to provide a device in which an electrical quantity is obtained as described in the object immediately above, but in which the quantity is one more than the whole number of angular units of rotation of the said shaft.

Still a further object of the invention is to provide a device for converting the rotation of a shaft into an electrical quantity whose value is proportional to the rotation of the shaft, the said quantity being measured as two parts, one of which is a step function and the other of which is a continuously varying function.

Still a further object of the invention is to provide a device of the character described in which there is a second shaft mechanically connected with the first shaft and in which each shaft has a variable potentiometer connected therewith, there being a predetermined relationship between the shafts and the potentiometers such that the output of both potentiometers will be a step function, increasing step by step as the shafts rotate.

Still a further object of the invention is to provide a device of the character described in the object immediately above in which there is a third potentiometer connected with one of the shafts and having an output which varies directly as the rotational displacement of the shaft to which the same is attached.

Still a further object of the invention is to provide in a device of the character described, means for eliminating the ambiguity which might occur as a potentiometer passes a zero position.

Still a further object of the invention is to provide a device of the character described in which a continuous output may be obtained of a continuing phenomenon, the said output comprising two parts, one of which is a step-function and the other of which is a continuous function comprising fractional portions of the quantity represented by one step.

Many other objects will become apparent as the description of the invention proceeds and many varied and useful purposes will occur to the artisan in addition to those hereinafter set forth. In order to render the explanation and description lucid, and to comply with the patent statutes I have illustrated a preferred embodiment of the step function output measuring device and I have illustrated the same diagrammatically although fully in the accompanying drawings such as to enable one skilled in the art to which same appertains to use, understand and practise the same. I have also illustrated certain refinements and one example of the manner in which the invention may be used for a specific purpose, but it is not intended to be limited by the illustrations.

In the drawings in which like characters represent the same or similar parts throughout the several figures of the drawings:

Fig. 3 is a schematic diagram showing an electronic circuit by means of which possible zero ambiguity is eliminated from my invention.

Fig. 4 is a schematic diagram of a portion of the invention illustrated in Fig. 1 and showing the manner in which the device illustrated in Fig. 1 may be used to obtain a continuous reading or record of the temperature in a furnace.

In the basic form of the invention which I will shortly describe, I utilize two circular potentiometers, the slider of each of which is respectively coupled with two shafts, one of which rotates and drives the other. The primary shaft may be the output from a computing device, may be the output of a servo motor, or may be some mechanical function converted into a given rotation. As the primary shaft rotates, it rotates the slider of one potentiometer and causes the slider of the other potentiometer to rotate as well. The potentiometers are connected in series across a source of voltage and the output of the two potentiometers is obtained as the voltage measured across their sliders. When the relationship between the resistance of the potentiometers and the mechanical advantage between the shafts is such as to satisfy certain requirements which will be set forth hereinafter, the voltage appearing at the output will increase step by step. This relationship is concerned with a factor N such that for each full rotation of the slider connected with the primary shaft (which is presumed to be the slower of the two) the slider of the second shaft will rotate N times.

The potentiometers are both linear and their respective values are such that the resistance of the slower moving or primary potentiometer is N times the resistance of the other or secondary potentiometer. Under these conditions the voltage of the output will be equal to the voltage occurring across the secondary potentiometer multiplied by the total number of whole revolutions made by the secondary potentiometer.

In order to obtain the fractional reading on a second output, a third or auxiliary potentiometer is coupled to the secondary shaft and a meter is provided to measure its output which will be directly proportional to the angular position of its slider.

In such rotary potentiometers there will be a point of ambiguity of one or two degrees which occurs when the slider passes over the terminals of the potentiometers. I have described hereinafter a method of suddenly switching the electrical position of the slider from full scale to zero position when the break in the resistance unit is reached.

Figure 1:
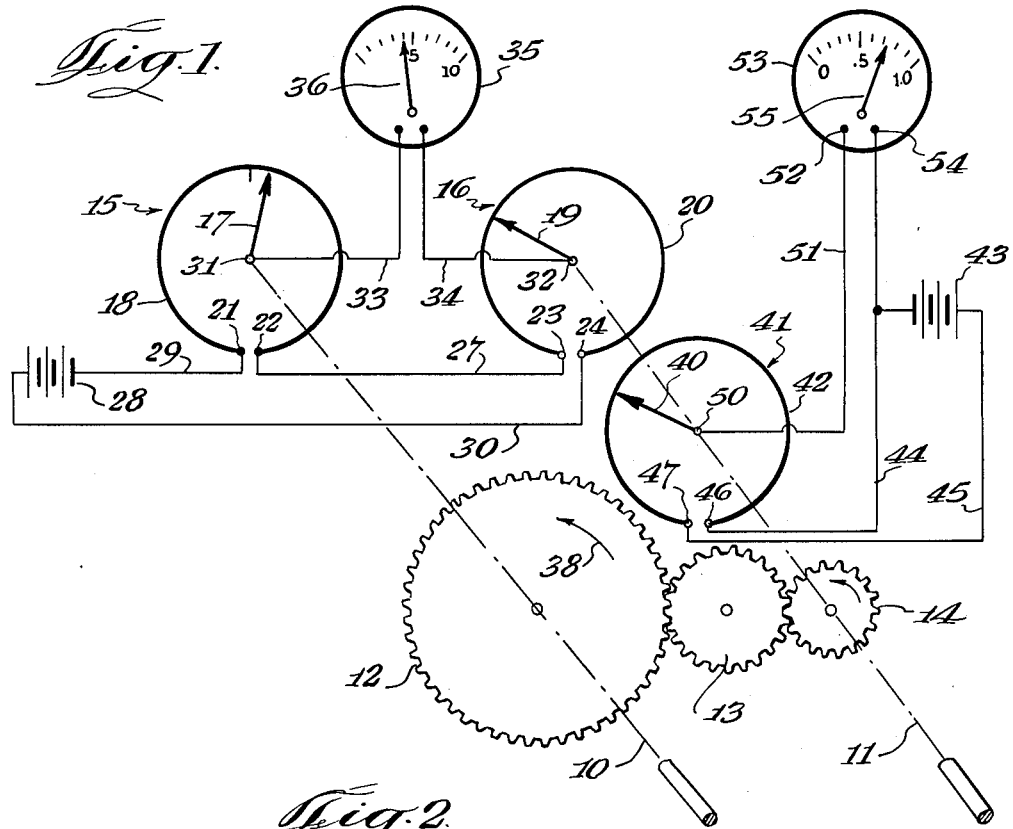
Fig. 1 is a schematic diagram showing the basic form of my invention and in which the output of a shaft is converted into two quantities, one of which is a step-function and the other of which is continuously variable.

In Fig. 1 I have shown the basic form of the invention in which the angular position of a shaft is measured in terms of at least an electrical quantity in steps, i. e., integers only. I have also illustrated a refinement whereby there is provided a fine scale measurement of fractions of the said integers, i. e. shaft position between integers. Although this may be extended to provide still another fine reading which is a fraction of the second quantity above referred to, in order to render the explanation lucid, the invention will be explained as though there are only two electrical quantities produced, a coarse reading quantity, varying only integer by integer, and a fine reading quantity varying directly as the angular position between any two consecutive integers, i. e., conventionally.

Figure 1 is a diagrammatic representation, and this should be borne in mind while the description proceeds.

Two shafts 10 and 11 are represented by parallel broken lines, a fragment of an actual shaft being shown at the lower right hand end of each line. The lines represent the shaft axes, and are also intended to designate that those elements terminating on the shafts are ganged together. This shortly will be explained. In the event the shaft whose angular position it is desired to measure rotates less than 360° the shaft 10 conveniently would be connected to drive the shaft 11. In the event that the shaft whose angular position it is desired to measure rotates a plurality of revolutions then the shaft 11 would be arranged to drive the shaft 10. The driving of the shafts may be accomplished by servo-motors, by mechanically arranged gearing, may be produced as a mechanical resultant equivalent to a quantity such as voltage, current, speed, temperature, thickness, or any of a large number of different kinds of rates, indications or the like. The great advantage is that the single quantity is immediately converted into two quantities, one of which is a whole number of units and the other of which is a fraction of a unit so that accurate coarse and fine readings, for example can be made. The invention is so flexible that the electrical quantities available can be used for driving printing devices if desired so that continuous and highly accurate records may be kept of continuously varying phenomena.

One particular example of the many uses of the invention is in case of a continuously indicating temperature device utilizing a thermocouple and a synchronized potentiometer to provide an error voltage to a servo-amplifier for energizing a motor to drive the shaft 11, for example.

The shafts 10 and 11 are mechanically connected in accordance with a constant factor N, which may be any number. Connection is effected through any mechanical means such as pulleys, belts, wheels, or gears. In Fig. 1, I have shown a gear train made up of three spur gears 12, 13 and 14. Gears 12 and 14 are fixedly mounted on the shafts 10 and 11 respectively and rotate therewith, and gear 13 intermeshes between gears 12 and 14. The ratios are chosen so that for every revolution of the shaft 10 the shaft 11 will rotate N times. Any number of gears may be used, if desired, and I have illustrated a gear train of three gears so that the shafts 10 and 11 will both rotate in the same direction.

Each shaft is connected to vary the resistance of a separate potentiometer. Thus the shaft 10 varies the resistance of the potentiometer 15 while the shaft 11 varies the resistance of the potentiometer 16. The potentiometers are the rotary type, and each has a circular resistance unit and a slider the pivot of which forms an electrical terminal. Shaft 10 mounts the slider 17 of the potentiometer 15 so that as the shaft rotates the slider will rotate and wipe the circular resistance unit 18 of the potentiometer, while the shaft 11 mounts the slider 19 of the potentiometer 16 so that as the shaft 11 rotates it carries the slider 19 with it and rotatively wipes the slider over the circular resistance unit 20 of the potentiometer 16. Each resistance unit has a pair of terminals and the resistance units are connected in series, and with a source of voltage. Thus, resistance unit 18 has terminals 21 and 22 while the resistance unit 20 has terminals 23 and 24. To connect the resistance units in series the terminals 22 and 23 are connected through an electrical lead 27 while the terminals 21 and 24 are connected to the source of voltage 28 through the leads 29 and 30 respectively connected to the terminals of the said source, which is indicated in Fig. 1 as a simple battery. Obviously it could be a source of A. C. voltage or a power pack or the like.

Figure 2:
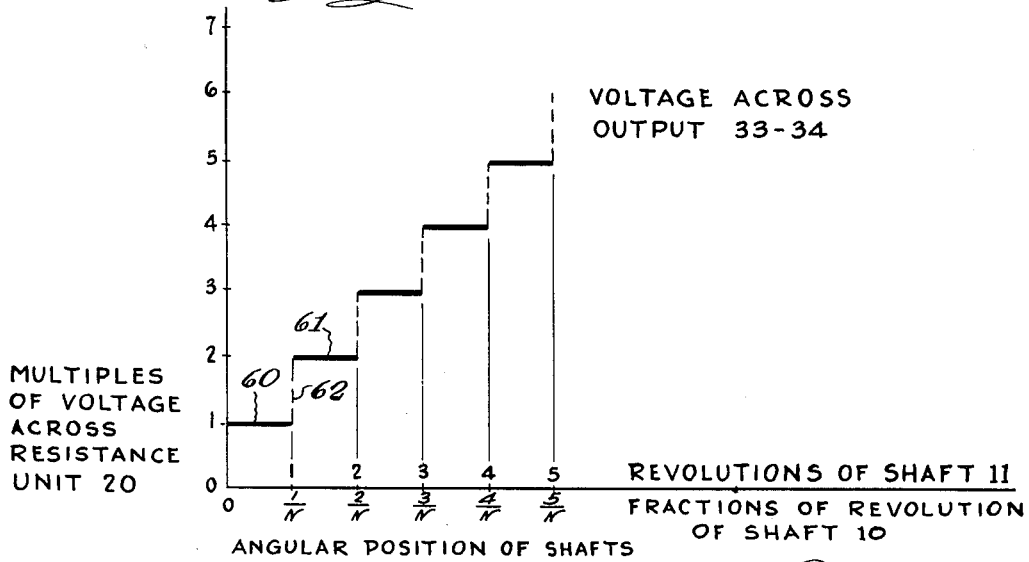
Fig. 2 is a graphical representation of the step-function of the output of my invention.

The rotating sliders have their respective pivots 31 and 32 electrically connected to leads 33 and 34 comprising the output and across which it is desired that the coarse quantity be measured, i. e., across which the voltage will be in whole units only. Speaking in simple terms, as the shaft 10 is rotated, the voltage readings across the leads 33 and 34 will be 1 unit, 2 units, 3 units, etc. There will be no intermediate values. The units may be any convenient ones such as volts, millivolts, or the like. In the event that a meter such as 35 is connected across the output 33—34 its needle 36 will jump from whole unit to whole unit. The characteristic of the output will therefore be a step characteristic as illustrated in Fig. 2.

Just for example, we may consider that the circuit constants and the mechanical characteristics have been chosen so that the complete rotation of the shaft 10 is intended to give a scale deflection of about ten units on the meter 35 and rotate the shaft 11 ten times. Starting at zero position of the shaft 10, the needle 36 will be at the zero scale marking of the meter 35 although the voltage output will be one unit. This can be a tare or zero adjustment of the meter. As the shaft 10 rotates in the direction of the arrow 38 (which I have chosen as the "increasing" direction for illustration) the needle 36 will not move until one tenth of a revolution has been made. At this point, the voltage across the output 33—34 suddenly jumps to two units. The needle 36 will thus also jump to the next scale marking which is 1. As the shaft 10 rotates, between .1 and .2 of a revolution, the needle 36 will remain on the 1 unit marking. When a full .2 revolution has been made, the needle suddenly jumps to the 2 unit mark. This continues throughout the entire rotation of the shaft 10. Obviously, at any given position of the shaft there will be only a whole number of units indicated by the needle. The rotative position of the shaft 10 in Fig. 1 has been taken as .471 of a revolution for illustrative purposes, and it will be seen that the needle 36 reads 4 units exactly.

The results thus far described are achieved by utilizing linear resistance units 18 and 20, and by choosing the total value of the respective resistance such that if the resistance of the unit 18 is R, the resistance R' of the unit 20 is R/N, where N is the mechanical advantage between the shafts 10 and 11. Putting the relationship in simple terms, the rate of rotation of the shaft 10 is $r$ then the rate of rotation $r'$ of shaft 11 is $Nr$. In other words, $$R' = R/N \quad (a)$$

$$r' = rN \quad (b)$$

or $$\frac{R'}{R}=\frac{r}{r'} \qquad (c)$$

The requirements as expressed by the relationship (c) can be stated as follows: The ratio of the resistance of one potentiometer to the other is exactly the inverse ratio of the rates of rotation of the respective sliders (or shafts).

It may be proven by simple mathematics that when the requirements of (c) above are met, and the resistance units are perfectly linear, that for any given position of shafts 10 and 11, the voltage output will be a whole number multiple of the voltage across the potentiometer 16; that the value of this voltage is one more than the number of whole revolutions that needle 19 has made multiplied by the voltage across potentiometer 16. This is demonstrated below::

Since voltage is proportional to resistance, the total voltage E across the two potentiometers may be taken as proportional to $R+R'$ or $$R+\frac{R}{N}$$

and voltage across the one potentiometer 16 is proportional to $$\frac{\frac{R}{N}}{R+\frac{R}{N}}$$

Clearing of fractions we see that the voltage E' across the potentiometer 16 is $$E'=\frac{1}{(N+1)}E \qquad (d)$$

where E is total voltage across the two potentiometers.

Now, for any given position of slider 17, of potentiometer 15 there will have been some whole fraction $$\frac{x}{N}$$

of the total resistance traversed plus some fraction $$\frac{y}{N}$$

traversed. For example $$\frac{4}{N}+\frac{.7}{N}$$

If N were 10, this would simply be .47 of a revolution. For every revolution of slider 17, the slider 19 rotates N times, so that the position $$\frac{x+y}{N}$$

of slider 17 resulting in a position $x+y$ of slider 19. The position of the slider 19 thus represents the fraction $y$ of the revolution. Obviously each whole revolution is not considered because the subtended resistance is not cumulative by virtue of the construction of the potentiometer.

The resistance subtended from 22 to the position of the slider 17 is $$\frac{x+y}{N}R \qquad (e)$$

That part of the resistance of the unit 20 in the output circuit, i. e. from terminal 23 to slider 19 is $$R'-yR'=R'(1-y) \qquad (f)$$

and in view of (a), this resistance is $$\frac{R}{N}(1-y) \qquad (g)$$

Total resistance in the output circuit is now (e) plus (g) or $$\frac{R}{N}(1-y)+\frac{R}{N}(x+1)=\frac{R}{N}(1-y+x+y)$$

$$\frac{R}{N}(x+1) \qquad (h)$$

The total output voltage, will therefore be $$\frac{\frac{R}{N}(x+1)}{R+\frac{R}{N}}E=\frac{\frac{R}{N}(x+1)}{\frac{R}{N}(N+1)}E=(x+1)\frac{E}{N+1} \qquad (i)$$

We have noted that $$\frac{E}{N+1}$$

is the voltage across potentiometer 16 from (d) above, and hence we have proven that the output voltage (i) is one more than the number of whole revolutions made by slider 19 (x) times the voltage across the potentiometer 16. The factor y has cancelled out, hence the voltage output (i) is a step function of the angular position of shafts.

In the above discussion it should be obvious that N must be greater than unity in order to achieve the objects of invention. Otherwise there would be no mechanical advantage between the shafts and R would equal R'. Also to avoid complex computations and unusual constructional difficulties it is best that N be a whole number.

Applying the above to the simple example illustrated, presume that $R=10,000$ ohms, $R'=1000$ ohms, and that N is thus 10. If we choose E equal to 11 volts, then the voltage across potentiometer 16 is 1 volt and across potentiometer 15 is 10 volts. If the slider 17 is positioned at .47 of the circumference of resistance unit 18, it subtends a resistance of 4701 ohms which has a drop of 4.7 volts. The remainder of resistance unit 20, i. e. from slider 19 to terminal 23 has a voltage drop of .3 volt, and hence the output is 5.0 volts. A tare of 1.0 volt has been built into meter 35 so that its needle reads 4.0 volts.

Since the position of shaft 11 represents the fractional part of the revolution of the slider 19, it enables one to obtain an indication of the next digit of the quantity represented by shaft rotation. The slider 40 of a potentiometer 41 is tied to shaft 11 and the slider wipes the circular resistance unit 42. A source of voltage 43 is connected by leads 44 and 45 to terminals 46 and 47 of the resistance unit 42, which is also a linear resistance. Pivot 50 of slider 40 is connected to lead 51 which is connected in turn to terminal 52 of a suitable meter 53. The other terminal 54 is connected to lead 44. Obviously the deflection of meter needle 55 will be proportional to the subtended resistance of resistance unit 42 to give the fine reading of the desired quantity. It is here shown as .71, so that the total reading of coarse meter 35 and fine meter 53 is "4.71." The last digit is estimated between divisions of meter 53.

Obviously, there can be a third shaft having a known relationship with the shaft 11, and another potentiometer whose linear resistance is such as to satisfy the relationship (c) but between this new shaft and potentiometer and the shaft 11 and potentiometer 16. This would enable the rotation of shaft 10 to be expressed in three readings the first two of which were coarse, and medium, and third fine. The mathematics and mechanics are capable of being resolved, using the teachings of this specification.

In Fig. 2 I have illustrated, in graphical form, the output of the device appearing at the leads 33—34. The vertical coordinates are multiples of voltage across the resistance unit 20, as defined by (d) above. Obviously this represents number of full revolutions of the slider 19. It will be seen from the mechanics of the situation that when both sliders are at zero, the total resistance 20, representing one voltage unit, is in the circuit. Hence the function begins at "1" as indicated by the reference character 60 and stays at this value while the first $$\frac{1}{N}th$$

of resistance unit 18 is being traversed. When this distance has been subtended, the slider 19 has made a whole revolution, and at terminals 23 and 24, the output suddenly jumps to 2 units at 61. The jump 62, being an intermediate phenomenon is illustrated with a broken line.

This continues as will be seen from the graph and after the whole unit 18 has been traversed, slider 17 having made one revolution and slider 19 having made N revolutions the function repeats.

Note that there is one more indicated unit than whole revolutions of slider 19 at any time. To obtain accurate readings, this is compensated as a tare or zero adjustment.

The potentiometers illustrated in Fig. 1 have actual physical constructions which are well-known. It will be noted that each of the resistance units 18, 20 and 42 is shown terminating in a pair of terminals. For example the unit 20 terminates at 23 and 24 to which electrical leads are connected. The space between these terminals is somewhat exaggerated, it actually being about two degrees more or less, but it is nonetheless finite. The slider 19 is required to pass over this space one for every 1/Nth movement of the slider 17, and unlike the potentiometer 41, the position of the slider 19 has an important influence upon the output at 33—34. The passage from the value of resistance at terminal 23 to the value at terminal 24 may give rise to ambiguous indications at the output, especially in the case where the output is being fed to a recording device, such as for example a printing system. I have devised a construction for alleviating this ambiguity.

Generally speaking, when the slider 19 reaches the end of the resistance unit, the electrical connection from the slider pivot 32 is suddenly switched to the terminal 24 so that the slider will not remain in the space between the two terminals. Likewise the meter 35 is prevented from floating at this time.

In Fig. 3 I have shown such a construction, applied to the device of Fig. 1. For clarity, I have omitted all parts of Fig. 1 not required to explain the construction and operation of this feature, but it is to be understood that same are nonetheless present. I have indicated the shaft 11 cooperating with the two potentiometers 16 and 41. The potentiometers are connected as described, except that in the case of the potentiometer 41, the pivot 50 also connects to a lead 65 which is the input to a D. C. amplifier 66, and in the case of the potentiometer 16, the lead 34 is opened to have a relay 67 inserted between the pivot and the meter 35.

Referring first to the modifications to the connections of potentiometer 16, the lead 34 terminates in a contact member 70 which is a part of the relay 67. The relay armature 71 carries a movable contact 72 which is connected to a lead 34' which is now one of the output leads along with 33 (not shown in this view). The relay coil 73 is in the output circuit of the D. C. amplifier as will be explained. The terminal 24 is connected to another fixed contact 75 which is adapted to be engaged by movable contact 72. There is a high ohmage resistor 76 connected between the terminal 23 and the lead 34'.

Disregarding the remainder of the circuit for the moment, the device operates somewhat as follows: The relay contacts are arranged as shown in the illustration, in which case the circuit is substantially the same as that of Fig. 1, with the electrical connection to the meter being completed from the pivot 32 through lead 34, contacts 70 and 72, armature 71, and lead 34' to the meter. When the slider has moved around to the terminal 23 and begins to leave the same, the relay coil 73 is energized suddenly, transferring the contact 72 to contact 75 which is connected to the terminal 24. As the slider passes over the blank space between terminals which I have designated 78 nothing of any consequence occurs, because the meter or output lead 34' is already connected to the terminal 24. There is no possibility of any ambiguous readings. The resistor 76 serves as a means for preventing the meter lead 34' from being totally floating, even during the swing of the armature 71. Since it is high ohmage, and the meter itself is preferably a high resistance meter, there will be no appreciable loss of current or voltage drop during normal operation.

The amplifier 66 consists of a phase inverter and a power output tube, the use of the two stages being to enable the relay normally to be a de-energized condition. When the slider 40, which of course is synchronized to move with the slider 19, reaches the terminal 47 and leaves the same, the negative bias on the tube 80 is increased, i. e., it becomes more negative since the bias is controlled by the grid leak 81. This is coupled to the grid 82 through resistor 83. This cuts off the tube and current no longer flows in the output thereof. The plate resistor is 84 connected to plate 85, the cathode 86 being grounded. Since the plate is now no longer passing current, the voltage at the output goes positive. The output is coupled through resistor 89 to the grid 90 of the normally cutoff tube 91. The tube 91 is thus normally not passing current, its grid 90 being biased through a resistor 92 to a rather high negative bias.

When the first tube 80 is cut off, the second tube 91 suddenly passes current and in the circuit of the plate 94 the series-connected relay coil 73 is energized. Note that the plate circuit includes the dropping resistor 95. The cathode 96 is grounded. Energizing the relay coil 73 switches the output to the terminal 24.

The amplifier 66 is adjusted by suitable variations in circuit constants, to remain in the condition described, i. e. with relay winding 73 energized, for some time that the slider 40 (and the slider 19 also) has passed over the break in the resistance unit. I have had successful operation by permitting the slider to move about ten percent of the distance around the circumference before sufficient positive voltage is applied to the lead 65 to raise the grid 82 above cut-off. When this occurs, tube 80 begins to conduct current, and tube 91 is cut off deenergizing the relay coil 73, and restoring the condition illustrated in Fig. 3.

Through the use of the structure described in connection with Fig. 3 I have been able to use relatively inaccurate mechanical elements and obtain high accuracy. One tenth of one percent is ordinary. Likewise I have decreased thereby the costs of the apparatus since the potentiometers need not be expensively and accurately constructed adjacent their terminals.

It will be obvious that I have devised a rather flexible and simple instrumentality for measuring various kinds of quantities. The output is easily handled either by indicating instruments or by other apparatus being driven. In order to more fully make known the exact manner in which the invention can be used in one of a large number of applications, I have illustrated in Fig. 4 a system whereby the temperature of a furnace or a body may constantly be metered or recorded.

I have shown the apparatus of the invention in bare schematic form, illustrating only the three gears 12, 13 and 14 and the two shafts 10 and 11, it being understood that the other essentials of the invention including, if desired that structure illustrated in Fig. 3 besides that illustrated in Fig. 1, are a part of the system. I have shown a potentiometer 100 having a rotating slider 101 moving over a linear resistance unit 102, the terminals 103 and 104 of which are connected by leads 105 and 106 to a source of voltage 107. From the lead 107 I connect another lead 108 to a thermocouple 109 which is located inside of a furnace, manifold stack, oven, air duct, or other body 110. The other terminal of the thermocouple 109 is connected to one side of a servo-amplifier 111 whose other side is connected by lead 112 to the pivot 113 of the potentiometer 100.

The slider 101 is coupled with the shaft 10 for movement therewith although it could be mechanically coupled to the system of shafts and gears in any desired manner. The servo-amplifier 111 feeds the servo-motor 114 through any suitable transmission means 115, the motor being connected with the shaft 11 for rotating the same. When a voltage is generated in the thermocouple which upsets the zero balance calibrated into the system, there is an error voltage produced which is amplified by the servo-amplifier, converted into proper voltages for rotating the motor 114. The rotation of the motor one way or the other adjusts the position of the slider 101 to zero balance, and in doing so will also move the sliders 17, 19 and 40 giving a pre-calibrated reading in coarse and fine quantities of the temperature of the thermocouple.

In other words, I convert the temperature of the thermocouple into an error voltage which in turn is converted into a mechanical movement that is measured by my apparatus.

Many different applications should suggest themselves to those skilled in the art, but it is desired to point out that the manner of application, as well as many different variations in the construction and parts can be made without departing from the spirit or scope of the invention as defined by the appended claims.

I claim:

1. A step-function output measuring device which comprises a pair of potentiometers each having a linear resistor with a single slider adapted to move in contact with and over the resistor, one resistor having a total resistance N times the second, N being any number greater than unity, means for moving said sliders over the resistors, said sliders being movable in continuously repetitive cycles, said means being arranged to move the slider of the said second potentiometer over the complete extent of its resistor as the slider of the first resistor moves over 1/Nth of its total extent, a source of voltage, with the resistors and source all connected in series, the voltage across the sliders being a step function of equal steps, increasing a single step with each cycle of movement of the slider of the second resistor.

2. A device as described in claim 1, in which the resistors are each formed as a substantially closed circle and the sliders move at constant rates relative to the resistors.

3. A step-function output measuring device which comprises a pair of potentiometers each having a single continuously movable slider engaging upon a circular linear resistor, one resistor having a total resistance N times the second resistor, N being any number greater than unity each slider being mounted for rotation with a rotating member, means mechanically interconnecting the members to rotate together, but with the second rotating member rotating N times for each revolution of the first rotating member, both resistors being connected in series, means applying a voltage across both resistors to have the same current flow therethrough and leads for connecting the sliders to a translating device.

4. A device as described in claim 3 in which there is a third potentiometer having a third slider and a third circular linear resistor, means applying a second voltage across said third resistor, said third slider being connected to move in synchronism with the second slider, and leads for connecting the said third slider to a translating device.

5. A step function output measuring device having a voltage output adapted to feed an indicating device or the like which comprises a pair of resistors in series with one another and with a voltage source to have the same current flowing therein, means for separately moving a tap of each resistor over the respective resistor, and lead means for connecting translating means across the taps, the resistors being linear and the rate of movement of the taps relative to the resistors being constant, the relationship between resistance and rate being defined as follows:

$$\frac{R'}{R} = \frac{r}{r'}$$

where:

R is the resistance of the first resistor,
R' is the resistance of the second resistor,
r is the rate of movement of the first tap,
r' is the rate of movement of the second tap, and
R is not equal to R'.

6. A step-function output measuring device having a voltage output adapted to feed an indicating device or the like, which comprises a pair of potentiometers connected in series with each other and in series with a voltage source to have the same current flowing therein, each potentiometer having a linear resistor and a single slider movable in contact with and upon the resistor, a shaft mounting each slider and mechanically connected one to the other in a pre-determined ratio, and said output being obtained across said sliders, the relationship of the resistances of the resistors and the ratio of movements of the shafts being defined as follows:

$$\frac{R'}{R} = \frac{r}{r'}$$

where:

R is the resistance of the first resistor,
R' is the resistance of the second resistor,
r is the rate of rotation of the first shaft,
r' is the rate of rotation of the second shaft, and
R is not equal to R'.

7. A measuring device for converting shaft rotation into a voltage for driving translating means or the like which comprises, a primary shaft mechanically connected to rotate with a secondary shaft with the secondary shaft having an angular advantage of N greater than unity times, N being a whole number, one or the other of said shafts adapted to be driven, primary and secondary potentiometers each having a circular linear resistor unit and a single slider movable upon the unit and respectively connected to the shafts such that rotation of the shafts will move the slider and resistor of each potentiometer relative one to the other, the resistance of the resistor unit of the primary potentiometer being equal to N times the resistance of the resistor unit of the secondary potentiometer, said resistor units being connected in series with each other and in series with a source of voltage whereby the same current flows through each resistor, and there appearing across the sliders a voltage which is a step function of equal horizontal steps whose value at any time is equal to the whole number of revolutions made by the secondary slider multiplied by the total voltage across the secondary resistor unit.

8. A measuring device for converting shaft rotation into a voltage for driving translating means or the like which comprises, a primary shaft mechanically connected to rotate with a secondary shaft with the secondary shaft having an angular advantage of N greater than unity times, N being a whole number, one or the other of said shafts adapted to be driven, primary and secondary potentiometers each having a circular linear resistor unit and a single slider movable upon the unit and respectively connected to the shafts such that rotation of the shafts will move the slider and resistor of each potentiometer relative one to the other, the resistance of the resistor unit of the primary potentiometer being equal to N times the resistance of the resistor unit of the secondary potentiometer, said resistor unit being connected in series with each other and in series with a source of voltage whereby the same current flows through each resistor, and there appearing across the sliders a voltgae which is a step function of equal horizontal steps whose value at any time is equal to the whole number of revolutions made by the secondary slider multiplied by the total voltage across the secondary resistor unit, a third potentiometer having a linear circular resistor and a slider movable relative to the unit and a second and independent source of voltage connected across the unit, and said third potentiometer being connected with the secondary shaft such that the slider thereof moves relative to its resistor unit in synchronism with the slider of the secondary potentiometer, there appearing at the slider of the third potentiometer a voltage whose value relative to the total voltage across the third resistor is directly proportional to the percentage of a full revolution which has been made by the slider of the secondary potentiometer.

9. In a device of the character described in which a potentiometer slider is required to move in engagement with a resistor unit having a circular formation but being discontinuous at the terminals thereof and said slider is normally connected to one conductor of a measuring circuit and the termminals of the resistor unit comprise a maximum voltage terminal and a minimum voltage terminal, means for alleviating the ambiguity arising by reason of the slider being poised between the terminals during its movement which comprises a switch for disconnecting the conductor from the slider and connecting same to one of said terminals, and means automatically actuating said switch when the slider leaves the second of said terminals comprising a variable resistance device connected with the slider and energized by a voltage source and the output of which varies in synchronism with the position of said slider, an amplifier having its input connected to the output of the variable resistance device, a relay actuating the switch, and the output of the amplifier being connected to the relay.

10. Apparatus as described in claim 9 in which said amplifier has a normally non-conducting output tube and a normally conducting input tube such that when the voltage of the variable resistance device is below a predetermined low value the relay will be operative but when the voltage of the variable resistance unit is above that value the relay will be inoperative.

11. Apparatus comprising a first shaft mounting a first potentiometer slider, a first potentiometer having a first circular linear resistor with said first slider in engagement therewith, a second shaft mounting a second slider engaging a second circular linear resistor of a second potentiomeier, a mechanical connection between shafts whereby the second shaft rotates N times the rate of the first shaft, the resistance of the first resistor being N times the resistance of the second resistor, N being any number greater than unity the resistors being connected in series a source of voltage connected across said resistors in series to provide the same current flowing through the resistors, and leads for connecting the sliders to an indicating device, the sliders being synchronized as to zero position thereof.

12. Apparatus comprising a first shaft mounting a first potentiometer slider, a first potentiometer having a first circular linear resistor with said first slider in engagement therewith, a second shaft mounting a second slider engaging a second circular linear resistor of a second potentiometer, a mechanical connection between shafts whereby the second shaft rotates N times the rate of the first shaft, the resistance of the first resistor being N times the resistance of the second resistor, N being any number greater than unity the resistors being connected in series a source of voltage connected across said resistors in series to provide the same current flowing through the resistors, and leads for connecting the sliders to an indicating device, the sliders being synchronized as to zero position thereof, a third potentiometer having a third slider and a third circular linear resistor, the slider being mounted on said second shaft and synchronized with the said second slider, a second source of voltage connected across the third resistor unit, and leads for connecting the third slider and the minimum voltage terminal of the third resistor unit to a second indicating device.

13. Apparatus comprising a first shaft mounting a first potentiometer slider, a first potentiometer having a first circular linear resistor with said first slider in engagement therewith, a second shaft mounting a second slider engaging a second circular linear resistor of a second potentiometer, a mechanical connection between shafts whereby the second shaft rotates N times the rate of the first shaft, the resistance of the first resistor being N times the resistance of the second resistor, N being any number greater than unity, a source of voltage connected across said resistors in series, and leads for connecting the sliders to an indicating device, the sliders being synchronized as to zero position thereof, a third potentiometer having a third slider and a third circular linear resistor, the slider being mounted on said second shaft and synchronized with the said second slider, a second source of voltage connected across the third resistor unit, and leads for connecting the third slider and the minimum voltage terminal of the third resistor unit to a second indicating device, and a fourth potentiometer having a fourth slider and a fourth circular resistor with the slider mounted on one of said shafts, a third voltage source connected across the fourth resistor, error-voltage producing means connected in opposing circuit with said fourth slider and a servo-amplifier having its input connected with said fourth slider and error-voltage producing means, a servomotor connected to the shaft to which the said fourth slider is not connected, and the output of the said servo-amplifier connected to energize the servomotor, such that the fourth slider will be rotated until the error voltage is balanced, the indicating devices thereby being respectively fed a coarse and fine voltage indicative of said error voltage.

14. A step-function output measuring device which comprises a pair of potentiometers each having a linear resistor with a single slider adapted to move in contact with and over the resistor, one resistor having a total resistance N times the second, N being any number greater than unity, means for moving said sliders over the resistors, said sliders being movable in continuously repetitive cycles, said means being arranged to move the slider of the said second potentiometer over the complete extent of its resistor as the slider of the first resistor moves over 1/Nth of its total extent, the resistors being connected in series a source of voltage connected in series with the resistors to provide the same current flowing through said resistors, the voltage across the sliders being a step function of equal steps, increasing a single step with each cycle of movement of the slider of the second resistor, said means comprising a pair of shafts respectively coupled to said sliders adapted to move the sliders as a shaft is rotated, said shafts being mechanically coupled with one another in relationship such that the sliders are moved as described.

References Cited in the file of this patent

UNITED STATES PATENTS

| | | |
|---|---|---|
| 1,268,712 | Harle | June 4, 1918 |
| 1,406,500 | Schneider | Feb. 14, 1922 |
| 2,374,439 | Korevec | Apr. 24, 1945 |
| 2,443,623 | Koenig | June 22, 1948 |
| 2,448,783 | De Giers et al. | Sept. 7, 1948 |
| 2,631,778 | Piper et al. | Mar. 17, 1953 |

FOREIGN PATENTS

| | | |
|---|---|---|
| 657,031 | Great Britain | Sept. 12, 1951 |
| 905,272 | France | Nov. 29, 1945 |